United States Patent [19]
Brady et al.

[11] Patent Number: 6,140,146
[45] Date of Patent: Oct. 31, 2000

[54] AUTOMATED RFID TRANSPONDER MANUFACTURING ON FLEXIBLE TAPE SUBSTRATES

[75] Inventors: Michael John Brady, Brewster; Dah-Weih Duan, Yorktown Heights; Harley Kent Heinrich, Brewster, all of N.Y.

[73] Assignee: Intermec IP Corp., Woodland Hills, Calif.

[21] Appl. No.: 09/365,792

[22] Filed: Aug. 3, 1999

[51] Int. Cl.[7] .................................................. H01L 21/00
[52] U.S. Cl. .................. 438/62; 438/57; 438/61; 257/723; 377/18
[58] Field of Search ................................ 438/48, 57, 61, 438/62; 257/723; 340/572.1; 29/827, 854; 156/247, 64; 377/18

[56] References Cited

U.S. PATENT DOCUMENTS

| 5,826,328 | 10/1998 | Brady et al. | 29/827 |
| 5,939,984 | 8/1999 | Brady et al. | 340/572.1 |
| 5,973,600 | 10/1999 | Mosher, Jr. | 340/572.8 |

*Primary Examiner*—Jey Tsai
*Assistant Examiner*—Viktor Simkovic
*Attorney, Agent, or Firm*—O'Melveny & Myers LLP

[57] ABSTRACT

Processes and apparatus for manufacturing radio frequency transponders having substrates formed from a flexible tape or film are disclosed. The RF transponders are formed on the tape so that their longest dimension (e.g., their length ("L")) is oriented parallel to the length of the tape. This layout places few or no constraints in the transponder's length allowing the length of the transponder's antenna circuit to be adjusted to satisfy the requirements of various applications.

25 Claims, 8 Drawing Sheets

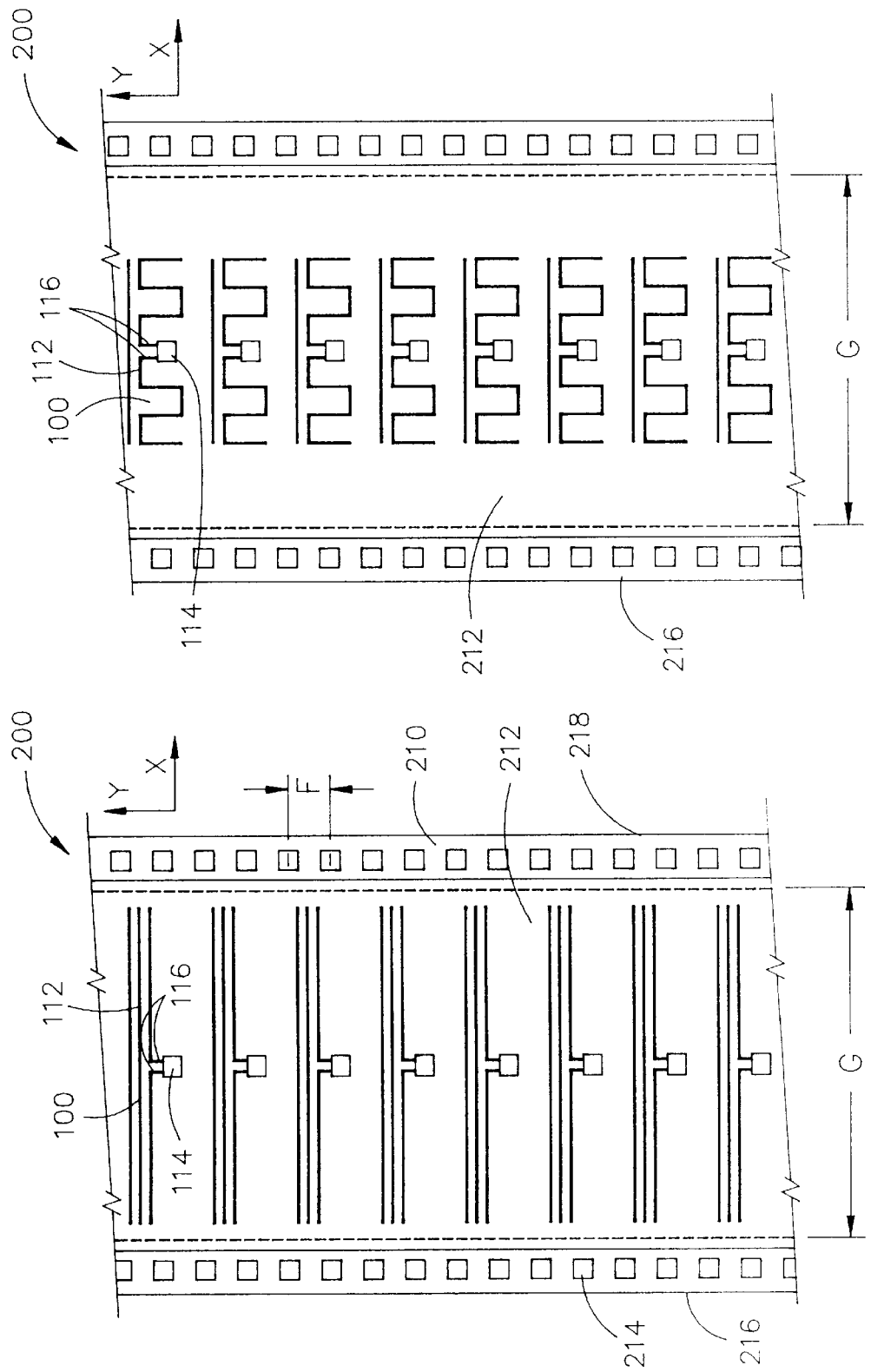

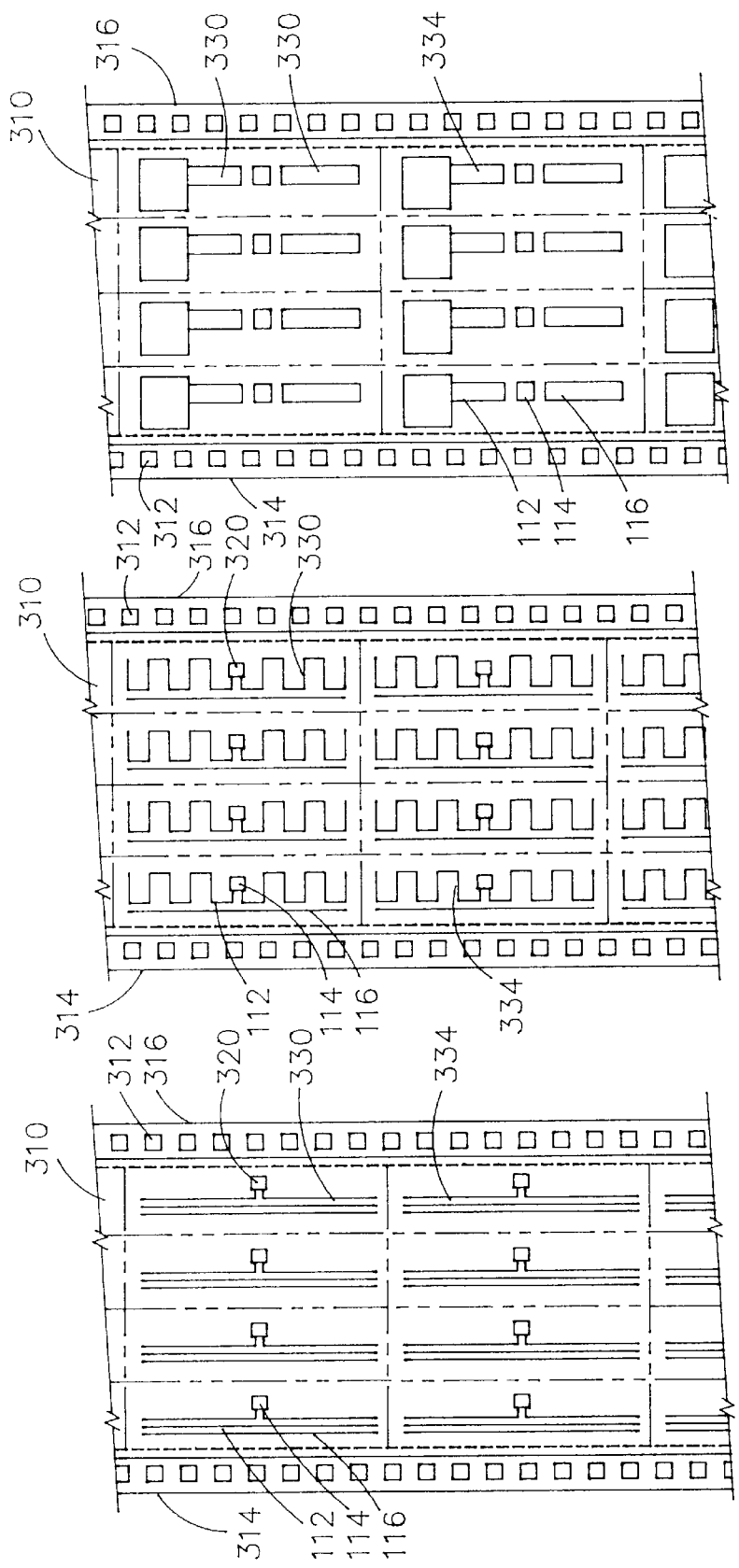

AUTOMATED RFID TRANSPONDER MANUFACTURING ON FLEXIBLE TAPE SUBSTRATES

FIELD OF THE INVENTION

The present invention relates generally to radio frequency (RF) transponders such as radio frequency identification (RFID) transponders, and more specifically to an improved method and apparatus for manufacturing radio frequency transponders having flexible tape substrates.

BACKGROUND OF THE INVENTION

In the automatic data identification industry, the use of RFID transponders (also known as RFID tags) has grown in prominence as a way to track data regarding an object on which an RFID transponder is affixed. An RFID transponder generally includes a semiconductor memory in which information may be stored. An RFID interrogator containing a transmitter-receiver unit is used to query an RFID transponder that may be at a distance from the interrogator. The RFID transponder detects the interrogating signal and transmits a response signal containing encoded data back to the interrogator. RFID systems are used in applications such as inventory management, security access, personnel identification, factory automation, automotive toll debiting, and vehicle identification, to name just a few.

Such RFID systems provide certain advantages over conventional optical indicia recognition systems (e.g., bar code symbols). For example, the RFID transponders may have a memory capacity of several kilobytes or more, which is substantially greater than the maximum amount of data that may be contained in a bar code symbol. The RFID transponder memory may be re-written with new or additional data, which would not be possible with a printed bar code symbol. Moreover, RFID transponders may be readable at a distance without requiring a direct line-of-sight view by the interrogator, unlike bar code symbols that must be within a direct line-of-sight and which may be entirely unreadable if the symbol is obscured or damaged. An additional advantage of RFID systems is that several RFID transponders may be read by the interrogator at one time.

An RFID transponder may be provided by an integrated circuit package affixed or coupled to a flexible substrate. Such flexible substrates may be efficiently manufactured using tape or film in a reel-to-reel packaging process. As shown in FIGS. 1A and 1B, the substrates 110 of such RF transponders 100 are typically rectangular in area having a length ("L") and a width ("W") wherein the length is greater than the width (L>W). In conventional reel-to-reel RFID transponder packaging processes 200, illustrated in FIGS. 2A, 2B, and 2C, RFID transponders 100 are formed transversely on the tape 210 (e.g., so that their length ("L") is aligned with the width ("x" direction) of the tape 210 while their width ("W") is aligned with the length ("y" direction) of the tape 210).

This conventional process 200 has several shortcomings. First, the tape 210 cannot accommodate a transponder 100 having a substrate 110 with a length ("L") longer than the workable width of the tape ("G"). Thus, the workable width of the tape ("G") limits the length of antenna circuits 112 formed on the substrate 110 of the RFID transponders 100. For example, RFID transponders 100 may be manufactured using tape 210 comprised of a polyimide film 212 having sprocket holes 214 formed along both edges 216 and 218. Such film 212 is typically manufactured in several standard widths of which the most common, and hence the most inexpensive, is thirty-five millimeter (35 mm). Consequently, utilizing the conventional process 200, larger films (e.g., seventy (70) mm, one hundred twenty (120) mm, etc.) must be utilized to manufacture RFID transponders 100 having lengths ("L") greater than the workable width ("G") of 35 mm film or tape (approximately twenty-nine (29) mm) at a correspondingly higher cost.

Further, wherein the length ("L") of the substrate 110 is less than the workable width of the tape (L<G), some areas near the edges 216 and 218 of the tape 210 are unused and wasted. Similarly, wherein the length of the substrate 110 is much less than the workable width of the tape (L<<G), large areas near the edges 216 and 218 of the tape 210 are wasted. Thus, as shown in FIG. 2C, wherein a wider film (e.g., 70 mm, 120 mm, etc.) is used in manufacturing the RFID transponders 100 having lengths ("L") of, for example, fifty (50) to fifty-five (55) mm, a large portion of the film 212 is wasted. Finally, the width ("W") of the substrate 110 is often of similar size to the sprocket hole pitch ("F") of the tape 210. Thus, the quantization error (i.e., the tape area wasted due to tape indexing by the sprocket holes 214) is usually very large in terms of the percentage of the actual transponder area. In order to reduce the quantization error, and thus improve the efficiency of the process, the design (and often the performance) of the RFID transponder 100 must be compromised.

As a result, it would be advantageous to provide improved methods and apparatus for manufacturing radio frequency transponders having flexible tape substrates wherein the length of the transponder is not limited by the workable width of the tape substrate.

SUMMARY OF THE INVENTION

Accordingly, the present invention is directed to novel methods and apparatus for manufacturing RFID transponders having substrates formed from a flexible tape or film. The RFID transponders are formed on the tape so that their longest dimension (e.g., their length ("L")) is oriented parallel to the length of the tape. This layout places few or no constraints in the transponder's length allowing the length of the transponder's antenna circuit to be adjusted to satisfy the requirements of various applications.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIGS. 2B and 2C illustrate the prior art arrangement of RFID transponders on the tape used in the process shown in FIG. 2A, wherein FIG. 2B illustrates RFID transponders having dipole antennas and FIG. 2C illustrates RFID transponders having meander antennas;

FIGS. 3E, 3F, 3G and 3H illustrate the arrangement of RFID transponders prior to their separation from the tape wherein the passivation layers of the antenna circuit pattern are formed utilizing an electroless process;

DETAILED DESCRIPTION OF THE INVENTION

Reference will now be made in detail to the presently preferred embodiments of the invention, examples of which are illustrated in the accompanying drawings. The present invention provides a method and apparatus for manufacturing RFID transponders having substrates formed from a flexible tape or film. The RFID transponders are formed on the tape so that their longest dimension (e.g., their length ("L")) is parallel to the length of the tape. This layout places few or no constraints in the transponder's length, thereby allowing the length of the transponder's antenna circuit to be adjusted to satisfy the requirements of various applications.

Figure 1A:
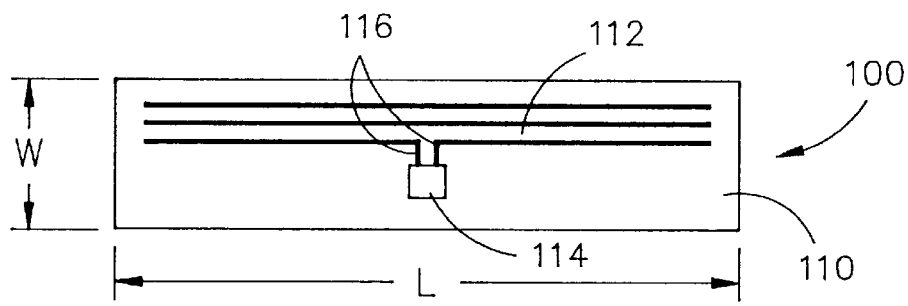
FIG. 1A is top plan view of an exemplary RFID transponder having a dipole antenna.
Figure 1B:
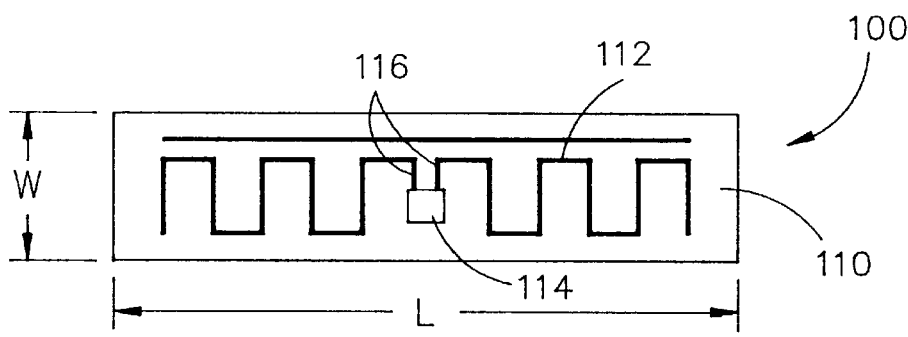
FIG. 1B is a top plan view of an exemplary RFID transponder having a meander antenna.
Figure 2A:
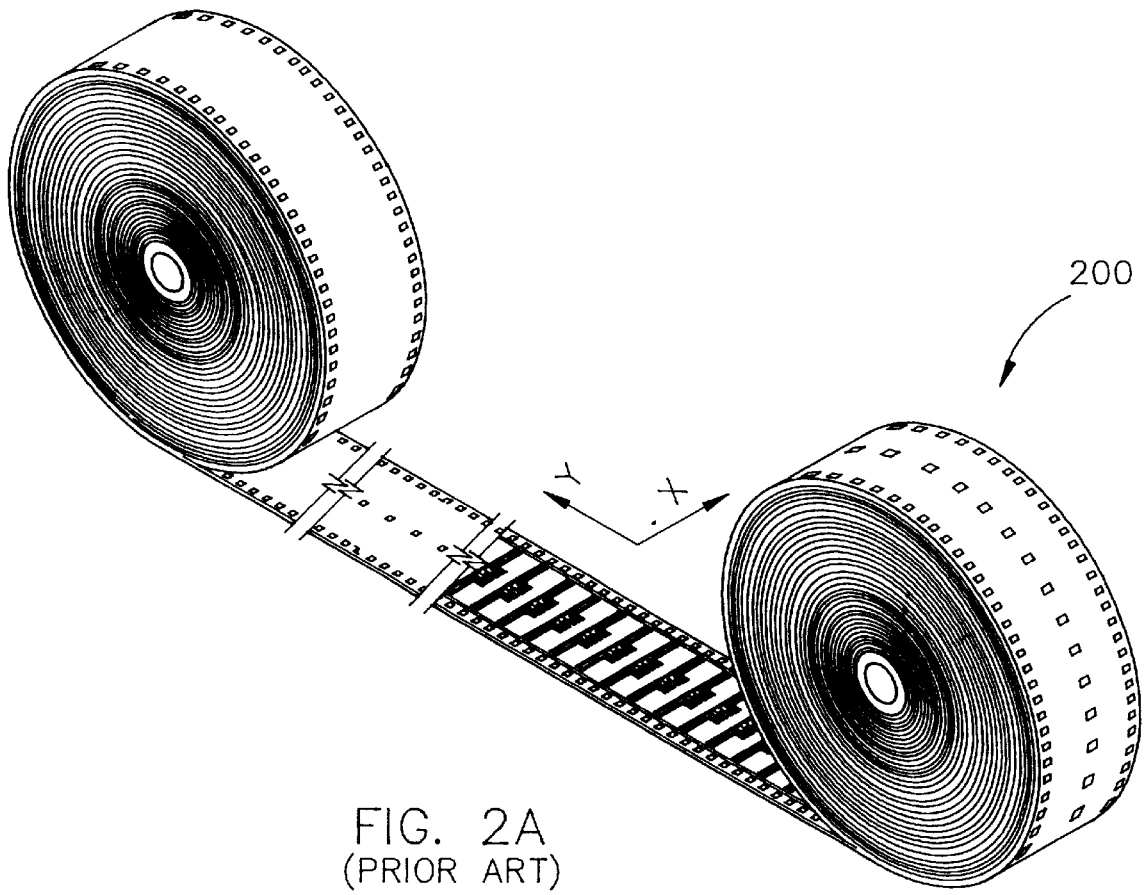
FIG. 2A is an isometric view illustrating the prior art process used to manufacture RF transponders having flexible substrates.

Referring now to FIGS. 1A and 1B, exemplary RFID transponders having thin, flexible substrates are shown. The RFID transponders 100 comprise a generally rectangular substrate 110 having a length ("L") and a width ("W") wherein the length is greater than the width (L>W). A low-power, radio frequency circuit, such as radio frequency identification integrated circuit (RFID IC) 114, is mounted to the substrate 110. The RFID IC 114 is coupled to the antenna circuit 112, which allows the transponder 100 to sense the interrogating field (and/or, where appropriate, a programming field). The antenna circuit 112 is also used to transmit the transponder response to an external interrogation. The RFID IC 114 and antenna leads 116 may be coated with an encapsulant, such as a "glob-top" epoxy, or the like, and/or laminated so that they are protected from damage due to environmental contaminants or handling.

Referring now to FIGS. 3A through 3H, a process and apparatus for manufacturing RFID transponders having flexible substrates is shown. In accordance with the present invention, RFID transponders, such as RFID transponders 100 shown in FIGS. 1A and 1B, are assembled on a roll of flexible tape or film 310 of a laminated organic material such as polyimide, polyester, or the like. In a preferred exemplary embodiment of the process 300, a 35 mm wide polyimide flex tape 310 having linearly arrayed sprocket holes 312 formed along both edges 314 and 316 (i.e., standard 35 mm film) may be used as the transponder substrate material.

Polyimide material has an advantageous ability to withstand elevated temperatures that may result from bonding of components and curing of the encapsulant. A metallized pattern 318 is formed on the tape 310 and is comprised of a plurality of antenna circuits 112. The longest dimension of the metallized pattern 318, and hence the longest dimension (e.g., the length ("L")) of the RF transponder substrates 110, is oriented to be parallel to the length ("y"-dimension) of the tape 310.

Preferably, the metallized pattern 318 provides for the formation of multiple antenna circuits 112 transversely or side-by-side on a tape 310 of a given width. For example, as shown in FIGS. 3C, 3D and 3E, wherein 35 mm tape 310 is used as the substrate material, a metallized pattern 318 allows the formation of antenna circuits 112 for three RF transponders 100 (FIG. 1A) transversely or side-by-side on the tape 310. The number of antenna circuits 112 that may be arranged transversely in a given metallized pattern 318 will depend upon the width (W) of each transponder's substrate (which is itself dependent on such factors as the width of the antenna geometry and RFID IC placement) and the width of the tape 310 utilized.

It should be appreciated that metallized patterns 318 providing a wide variety of antenna circuit configurations or geometries, (e.g., dipole, folded dipole, loop, coil, spiral, meander, patch, etc.,) may be formed depending on the particular requirements of the application in which the RF transponders 100 (FIGS. 1A and 1B) are to be used. Thus, substitution of one antenna circuit configuration or geometry for another by one of ordinary skill in the art is anticipated and would not depart from the scope and spirit of the invention. Further, the metallized pattern 318 may include impedance adjustment elements 116 that modify the impedance of the antenna circuit 112. Exemplary impedance adjustment elements 116 include, but are not limited to, lumped circuit elements, distributed microwave circuit elements, and parasitic elements (e.g., loading bars, shown) that are electromagnetically coupled to the antenna (i.e., not electrically connected).

After formation of the metallized pattern 318, radio frequency circuits such as radio frequency identification circuits (RFID IC) 114 are attached to the tape 310. The RFID IC's 114 are electrically connected with the antenna circuits 112 of the antenna circuit pattern 330 via known processes, such as wire bonding (shown), flip-chip attachment processes, or the like. In an exemplary embodiment, RFID IC's 114 may be placed in an aperture 320 formed in the tape 310. Preferably, the apertures 320 are punched or cut in the tape 310 at intervals corresponding to the location of the metallized pattern 318 where the antenna circuit 112 is to be attached with the RFID IC 114. An encapsulant may be deposited over the RFID IC 114 (e.g., within the aperture 320) and cured. If desired, a laminate may be applied to one or both sides of the tape 310 to protect the RFID transponders 100 from damage due to environmental exposure. The finished RFID transponders 100 are then singulated (e.g., punched, sheared or cut) from the tape 310. Alternatively, the tape 310 may be re-rolled providing an efficient way to store or transport the RFID transponders 100. The finished RFID transponders 100 may then be singulated from the tape 310 at a later time.

The present invention allows RFID transponders 100 to be manufactured having antenna lengths greater than the workable width ("G") of the tape 310 since the antenna is oriented along the length of the tape 310 (the "y"-direction) and not along the its width (the "x"-direction). Furthermore, while the length ("L") of the substrate 110 is less than (or much less than) the workable width ("G") of the tape 310 (e.g., L<G or L<<G), the present invention allows the RFID transponders 100 to be more efficiently arranged (e.g., tightly packed) on the tape 310 so that substrate material near the tape's edges 314 and 316 is not wasted. This arrangement of RFID transponders 100 on the tape 310 also results in a smaller percentage quantization error than is possible for prior layouts, thereby allowing more flexibility in design with less compromise in transponder performance.

As shown in FIGS. 3B, 3C, 3D, 3E and 3F, the metallized pattern 318 is comprised of one or more conductive metals formed in layers on the surface of the tape 310. In an exemplary embodiment, a base layer 322 comprised of a thin layer of copper may be plated, deposited, laminated, glued, adhered, or screened onto the surface of the tape 310. The base layer 322 is then etched to form an antenna circuit pattern which includes the specific geometric configurations of the antenna circuits 112. One or more passivation layers 326 and 328, comprised of thin layers of metals such as nickel, gold, or the like, may then be deposited onto the etched base layer 322 to facilitate bonding of the antenna circuit 112 to the contacts of the RFID IC 114 and to prevent oxidation and corrosion of the base layer 322.

In a preferred exemplary embodiment, gold is used as the outermost passivation layer 328 because it possesses good metallurgical fusion properties, good electrical conducting properties, and is less reactive chemically than copper (i.e., does not oxidize as readily as copper). Nickel is used as an intermediate passivation layer 326 between the gold passivation layer 328 and copper base layer 322. Nickel is preferred because it is capable of intermetallic fusion with both gold and copper. Additionally, nickel forms a diffusion barrier between the gold passivation layer 328 and copper base layer 322, preventing the gold from diffusing into the copper over time. Finally, nickel provides the mechanical rigidity necessary for bonding of the antenna circuits 112 with the RFID IC 114 via known bonding methods, such as wire bonding or flip-chip bonding.

Figure 3A:
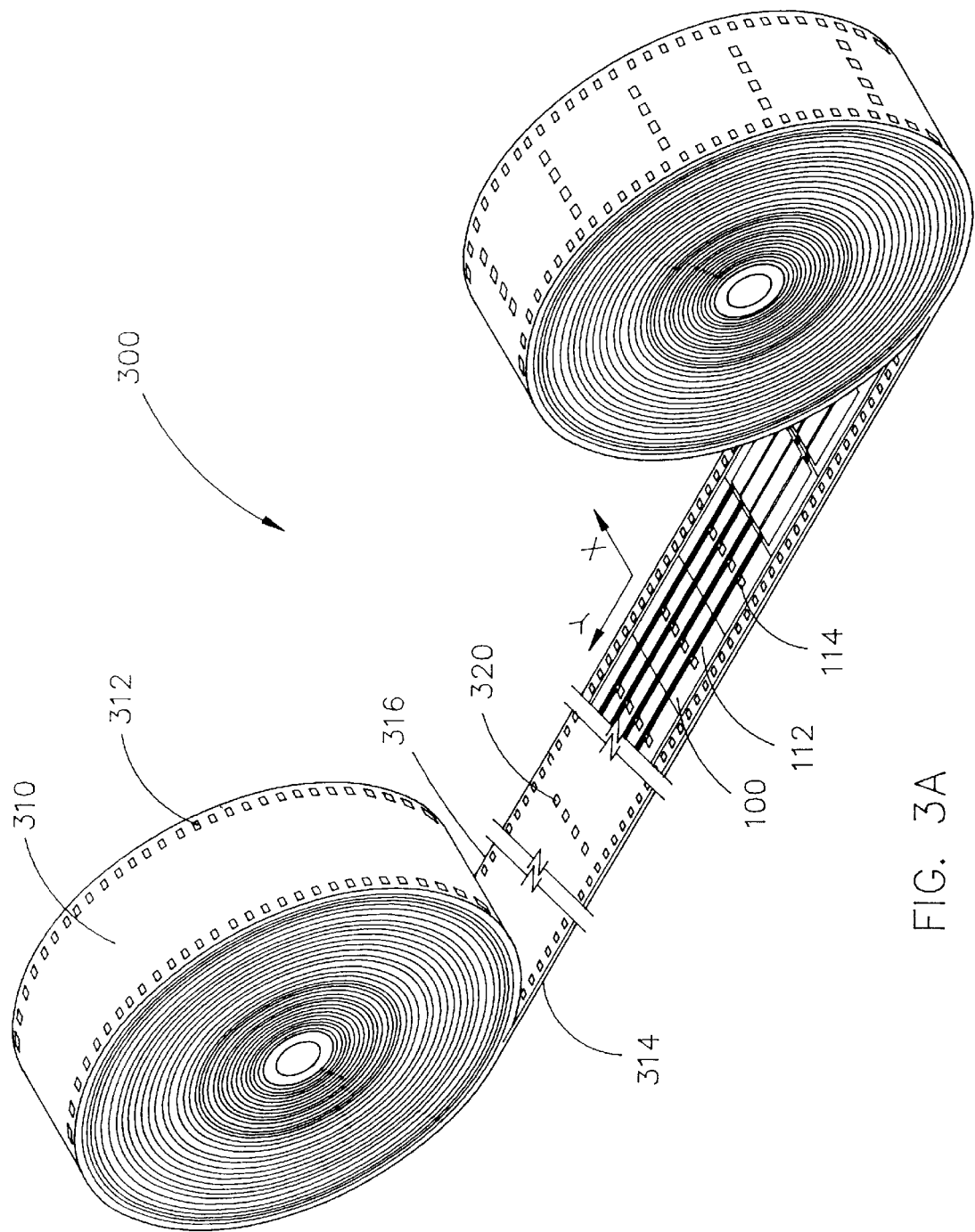
FIG. 3A is an isometric view illustrating a process used to manufacture RFID transponders (i.e., a tape automated bonding (TAB) process, a chip-on-board (COB) process, a chip-in-board (CIB) process, etc.) in accordance with the present invention.
Figure 3B:
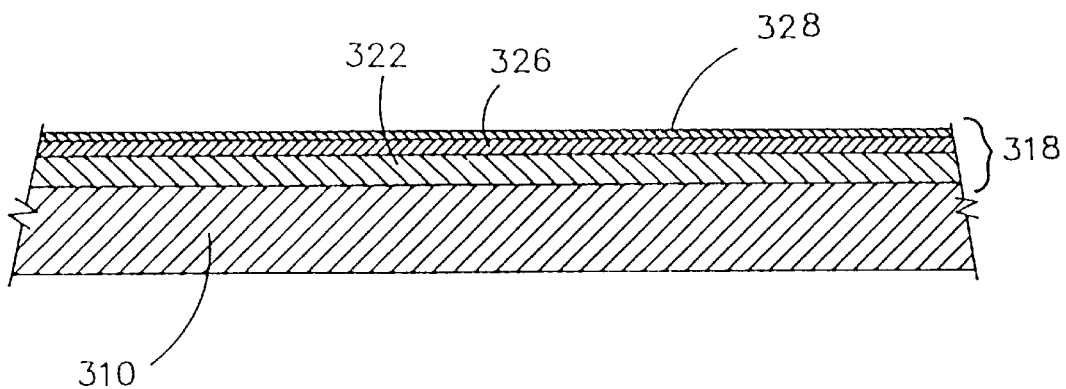
FIG. 3B is a cross-sectional side elevational view illustrating the formation of an antenna circuit pattern on the tape.
Figures 3C, 3D:
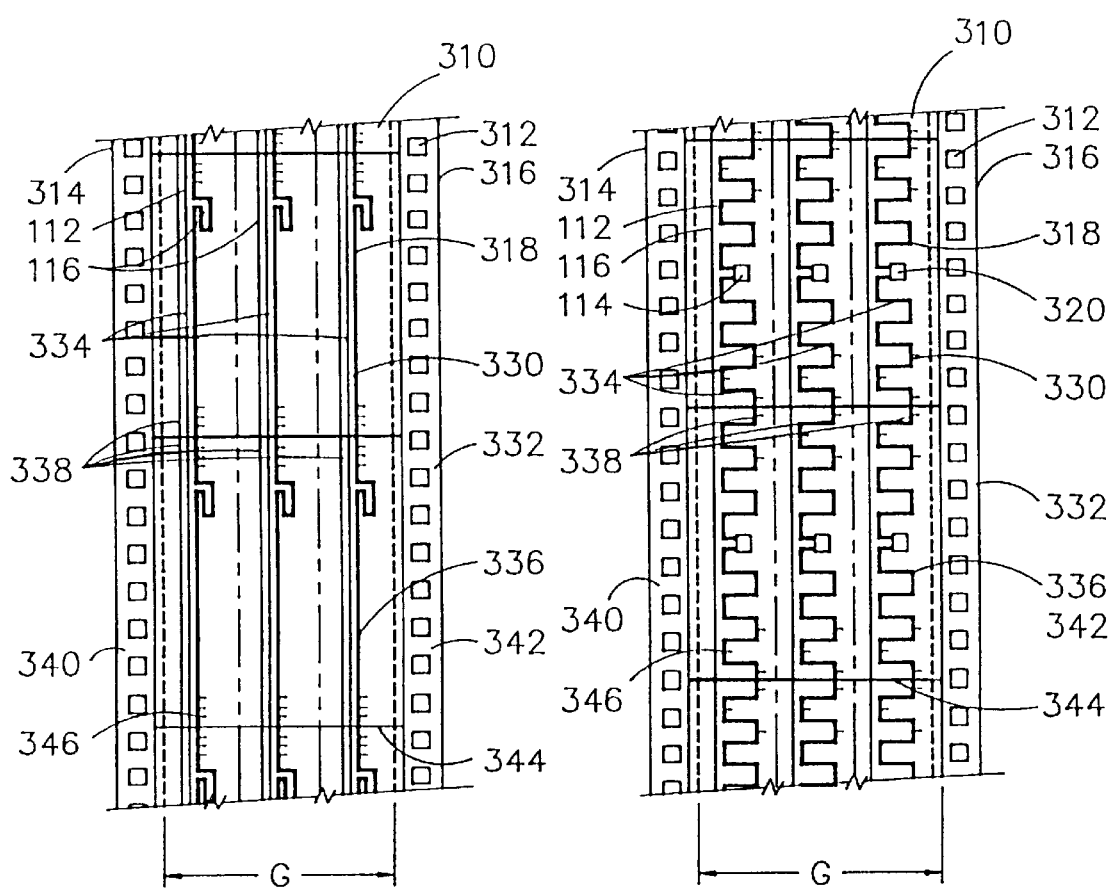
FIGS. 3C and 3D illustrate the arrangement of RFID transponders prior to their separation from the tape wherein passivation layers of the antenna circuit pattern are formed utilizing an electrolytic process.
Figure 3E:
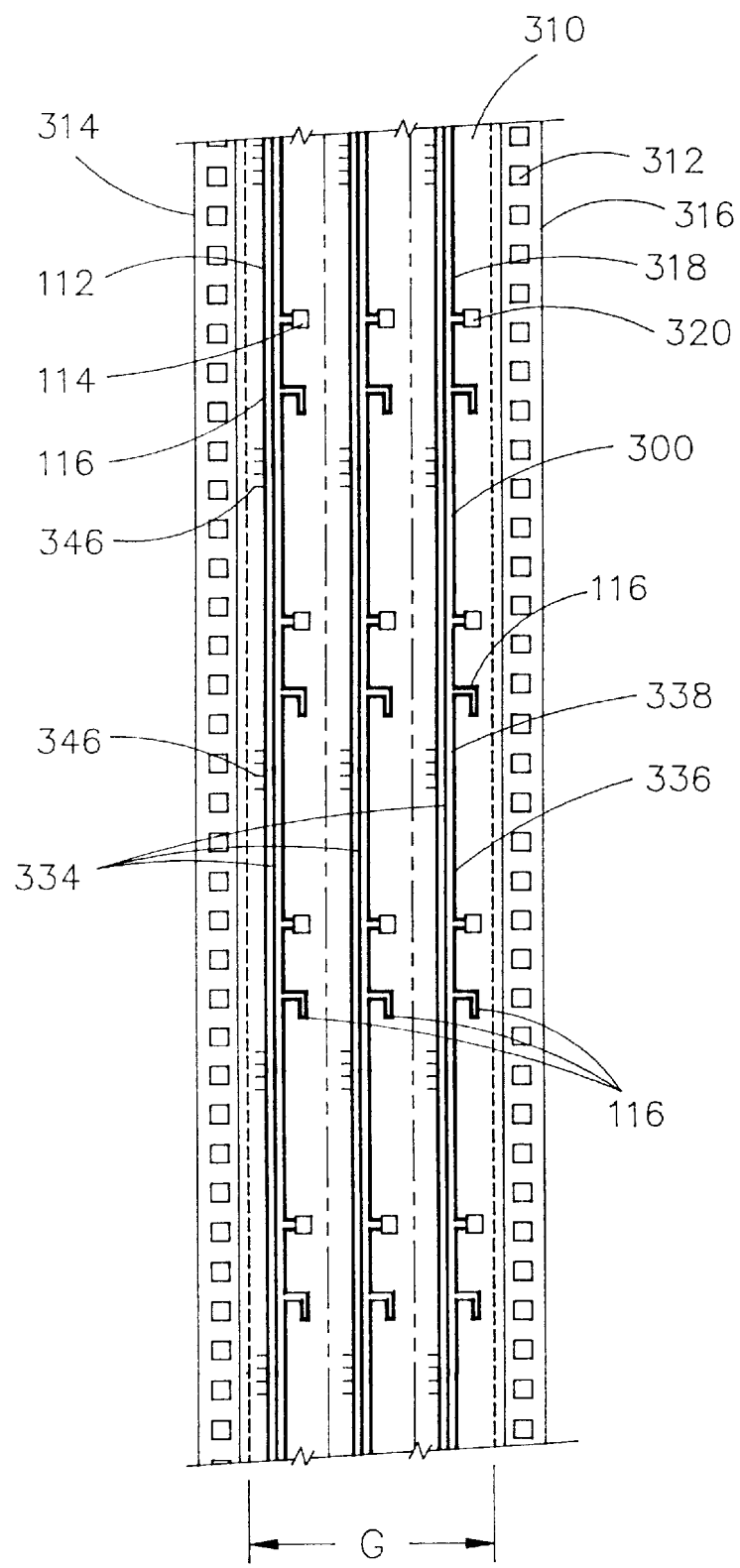

Referring now to FIGS. 3B, 3C and 3D, an electrolytic process may be used to form the passivation layers (e.g., the nickel and gold layers) of the metallized pattern 318. As shown in FIGS. 3C and 3D, the metallized pattern 318 comprises an antenna circuit pattern 330 from which individual antenna circuits 112 are formed, and a bussing structure 332 for connecting the antenna circuit pattern 330 with an electrode of an electroplating assembly (not shown) to enable the electroplating process.

The antenna circuit pattern 330 is comprised of one or more traces 334 aligned so as to extend along the length of the tape 310 (i.e., the "y"-direction) within the workable area ("G") on which RFID transponders 100 are to be fabricated. The traces 334 are shaped so that the characteristic geometry of the desired antenna circuit 112 is formed at periodic intervals (i.e., joined end-to-end) along their length. In the preferred exemplary embodiments shown in FIGS. 3C and 3D, the antenna circuit pattern 330 is comprised of three sets of traces 334 including antenna circuit sections 336 shaped to provide the desired characteristic geometry of the desired antenna circuit 112. Short antenna length adjustment sections 338 are interposed between each antenna circuit section 336. For example, antenna circuit patterns 330 for RF transponders 100 having dipole (FIG. 3B) and meander dipole (FIG. 3C) antenna circuits 112 are shown. Both antenna circuit patterns 330 include traces 334 from which impedance loading bars 116 are formed.

The bussing structure 332 is comprised of metallized border areas 340 and 342 formed along each edge 314 and 316 of the tape 310 around the sprocket holes 312 and a plurality of bussing lines 344 extending between the border areas 340 and 342 at periodic intervals along the tape 310. The bussing lines 344 electrically connect the antenna circuit pattern 330 to the border areas 340 and 342. Preferably, the bussing lines 344 are interspersed along the tape 310 at periodic intervals so they intersect the antenna circuit pattern 330 within the antenna length adjustment sections 338. As shown in FIGS. 3C and 3D, the bussing lines 344 preferably intersect the antenna length adjustment section 338 extending between each antenna circuit section 336. Alternatively, the bussing lines 334 may divide the traces 334 into groups of two or more antenna circuit sections 336 (not shown).

After the base layer 322 of the metallized pattern 318 is formed, one or both of the border areas 340 and 342 of the bussing structure 332 are electrically connected to an electrode of an electroplating apparatus (not shown). Connection of the antenna circuit pattern 330 to the electrode is provided via the bussing structure 332 (through bussing lines 344). One or more passivation layers 324 and 326 are then electroplated onto the base layer 322.

In accordance with the preferred exemplary embodiment described herein, a base layer 322 of copper having the geometry of the antenna circuit pattern 330 and the bussing structure 332 is formed on the tape 310. The base layer 322 is preferably formed from half pound copper having a thickness of approximately 17 to 18 microns ($\mu$). An intermediate layer 326 of nickel is then electroplated onto the copper base layer 322. The nickel intermediate layer preferably has a thickness of about 1 to 2 $\mu$. Finally, an outer passivation layer 328 of gold is electroplated onto the nickel intermediate layer 326. This outer passivation layer 328 may have a thickness of about 0.3 to 0.5 $\mu$.

Alternatively, an electroless process may be used to form the passivation layers (e.g., the nickel and gold layers) 326 and 328 of the metallized pattern 318. Such a process would not require the bussing structure 332 of the electrolytic process shown in FIGS. 3C and 3D. Thus, as shown in FIGS. 3E, 3F, 3G and 3H, only the antenna circuit pattern 330 needs to be formed on the tape 310. As shown in FIG. 3E, the antenna circuit pattern 330 may be comprised of one or more traces 334 aligned so as to extend along the length of the tape 310 (i.e., the "y"-direction) within the workable area ("G") as discussed above. As shown in FIGS. 3F, 3G and 3H, since no bussing structure is required, antenna circuits 114 may also be formed as separated patterns 346 on the surface of the tape 310 instead of a single generally continuous antenna circuit pattern 334 as shown in FIG. 3E.

Known electroless plating processes are generally self-limiting (e.g., the plating process cannot proceed after a certain thickness of the plating metal is formed on the base metal). Thus, referring to FIG. 3B, passivation layers 326 and 328 formed utilizing an electroless process are typically thinner than they would be when formed utilizing an electrolytic process. Even so, the thicknesses of passivation layers 326 and 328 are generally sufficient for preventing oxidation or corrosion of the base layer and for facilitating bonding of RFID IC's 114 to the antenna circuits 112. As with the electrolytic process, in an exemplary embodiment, the base layer 322 may be formed from half pound copper having a thickness of approximately 17 to 18 microns ($\mu$). Utilizing an electroless process, however, the intermediate nickel passivation layer 326 has a thickness of only about 0.2 $\mu$. Similarly, the outer passivation layer 328 of gold may have a thickness of only about 0.1 $\mu$.

Figure 4A:
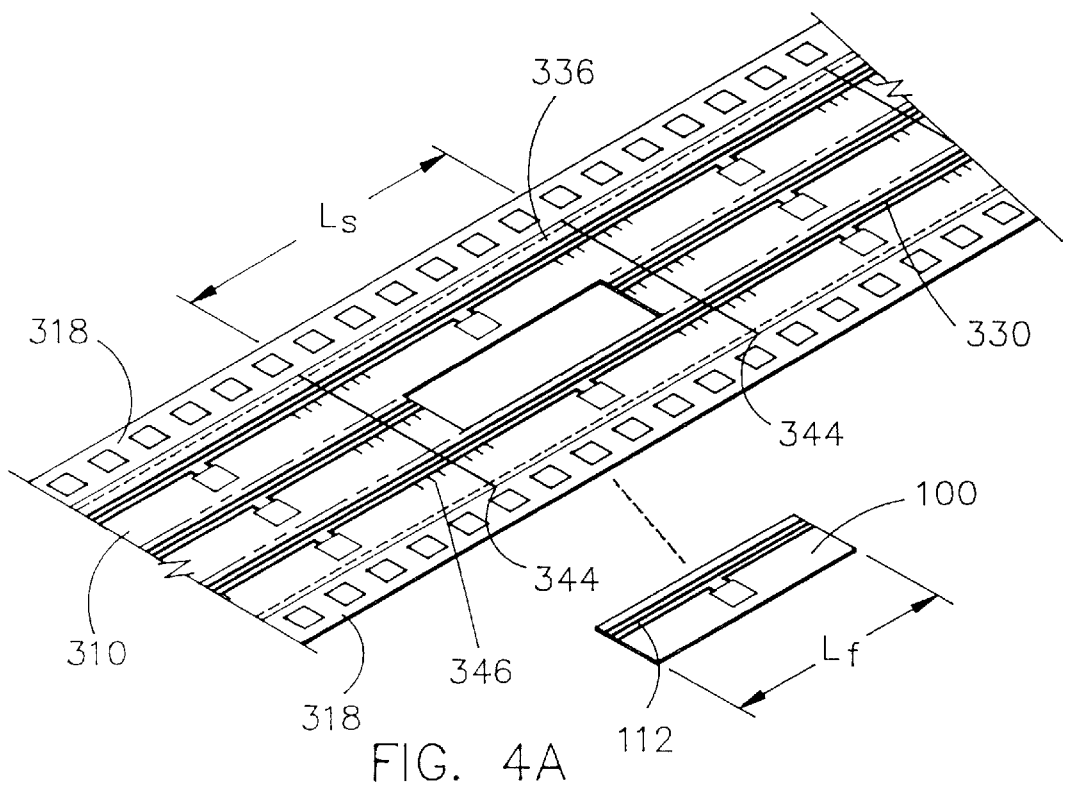
FIGS. 4A and 4B illustrate the separation of completed RFID transponders as shown in FIGS. 3B and 3C from the tape.
Figure 4B:
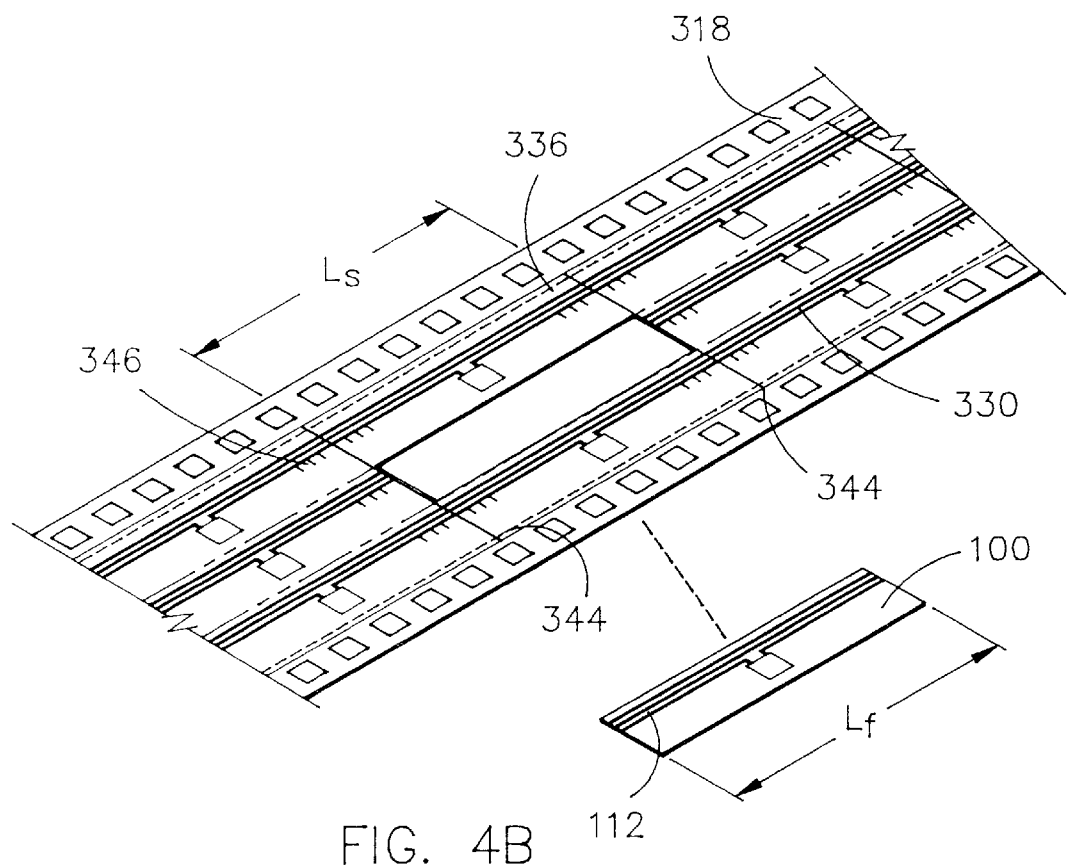

Referring now to FIGS. 4A and 4B, singulation of RF transponders from a tape having a continuous antenna circuit pattern formed utilizing the electrolytic process shown in FIGS. 3C and 3D is illustrated. As shown, antenna circuit section 336 may occupy an area having a length ($L_s$). Preferably, the antenna circuit pattern length ($L_s$) is substantially identical to the distance between bussing lines 344 formed on the tape 310 as shown in FIGS. 3C and 3D. RFID transponders 100 comprising antenna circuits 112 having a desired finished length ($L_f$) may be singulated from the tape 310 within the area occupied by the antenna pattern 336 such that the finished length is less than or equal to the length of the antenna circuit pattern length ($L_f \leq L_s$). In this manner, the generally continuous antenna circuit pattern 330 shown in FIGS. 3C and 3D allows the antenna circuit 112 to be trimmed to different lengths ($L_f$) from a single basis geometry so that the antenna length may be adjusted for various applications. For example, an RFID transponder 100 trimmed to have a shortened antenna circuit 112 is shown in FIG. 4A, while an RFID transponder 100 having a longer antenna circuit 112 is shown in FIG. 4B. Preferably, RFID transponders 100 may be manufactured comprising antenna circuits 112 having lengths limited only by basis geometry of the metallized pattern 318 (e.g., the spacing of bussing lines 344 and RFID IC connection points on metallized pattern 318 on the tape 310). Further, the basis geometry of the antenna metallized pattern 318 may be modified so that spacing of the bussing lines 344 may be increased or decreased. Tick marks 346 may be provided at finished lengths ($L_f$) for given applications to facilitate singulation of RFID transponders 100 having antenna circuits 112 of the desired length.

Figure 5A:
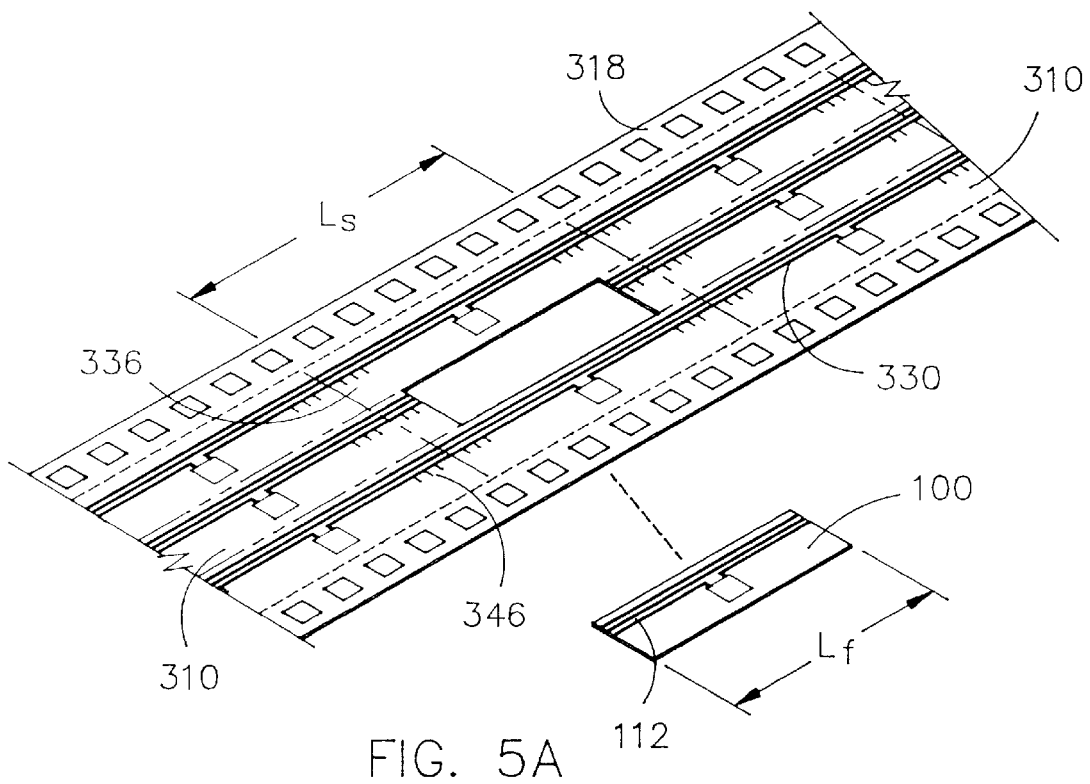
FIGS. 5A and 5B illustrate the separation of completed RFID transponders as shown in FIGS. 3B and 3C from the tape.
Figure 5B:
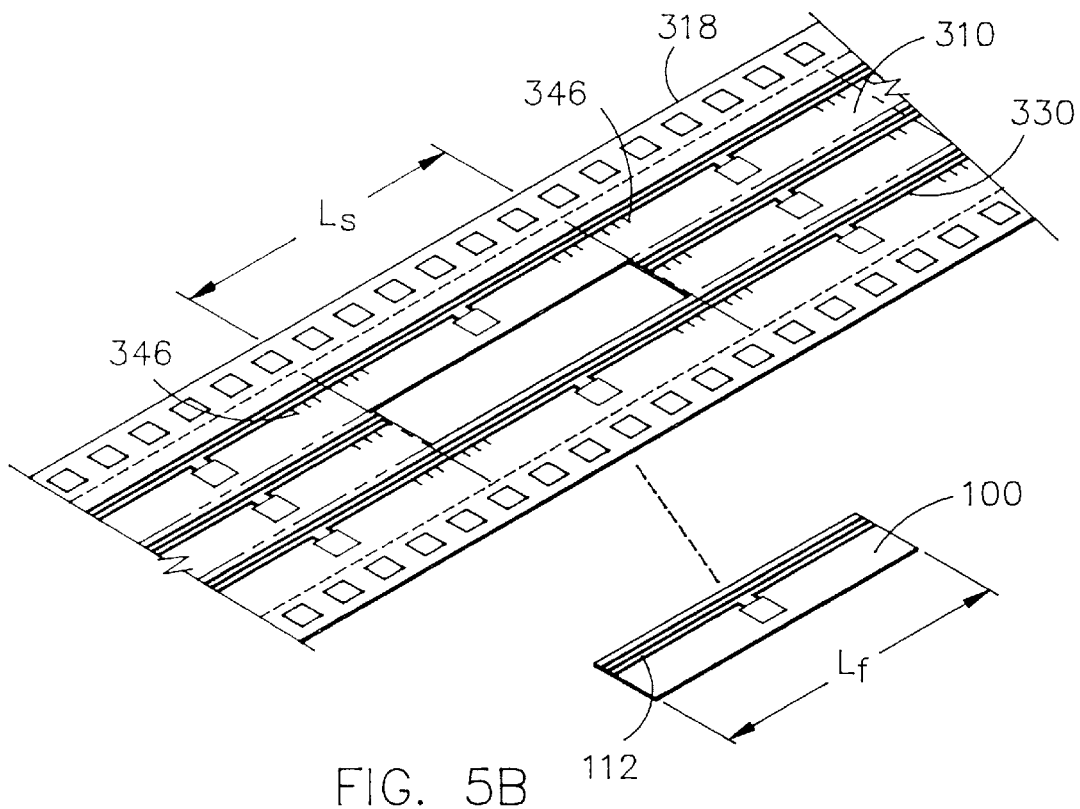

Referring now to FIGS. 5A and 5B, singulation of RFID transponders from a tape having a continuous antenna circuit pattern formed utilizing the electroless process shown in FIG. 3E is illustrated. As shown, the antenna circuit section 336 may occupy an area having a length ($L_s$). This length ($L_s$) may be adjusted as necessary. RFID transponders 100 comprising antenna circuits 112 having a desired finished length ($L_f$) may be singulated from the tape 310 within the area occupied by the antenna pattern 336 such that the finished length is less than or equal to the length of the antenna circuit pattern length ($L_f \leq L_s$). In this manner, the generally continuous antenna circuit pattern 330 shown in FIG. 3E, like the patterns shown in FIGS. 3C and 3D, allows the antenna circuit 112 to be trimmed to different lengths ($L_f$) from a single basis geometry. For example, an RFID transponder 100 trimmed to have a shortened antenna circuit 112 is shown in FIG. 5A, while an RFID transponder 100 having a longer antenna circuit 112 is shown in FIG. 5B. Thus, RFID transponders 100 may be manufactured comprising antenna circuits 112 having lengths limited only by the basis geometry of the metallized pattern 318 (e.g., the spacing of RFID IC connection points on metallized pattern 318). Tick marks 346 may be provided at finished lengths ($L_f$) for given applications to facilitate singulation of RFID transponders 100 having antenna circuits 112 of the desired length.

It should be appreciated that by arranging the RF transponders such that the length (L) dimension is oriented parallel to the length ("y"-dimension) of the tape, plural RF transponders are provided for the corresponding indexed progression of the tape. In particular, as shown in FIGS. 4A–4B, 5A–5B, there are three RF transponders across the width of the tape 310. By contrast, the prior art arrangement of RF transponders permits only a single RF transponder for the corresponding indexed progression of the tape.

It is believed that the attendant advantages of the present invention will be understood by the foregoing description, and it will be apparent that various changes may be made in the form, construction and arrangement of the components thereof without departing from the scope and spirit of the invention or without sacrificing all of its material advantages. The form described above being merely an explanatory embodiment thereof, it is the intention of the following claims to encompass and include such changes.

What is claimed is:

1. A process for manufacturing a radio frequency transponder, comprising the steps of:
   forming a metallized pattern on a tape of insulating, flexible substrate material having a usable width, the metallized pattern comprising at least one area of characteristic geometry having a length and a width wherein the length is greater than the width and is oriented longitudinally along the tape; and
   arranging said metallized pattern to achieve at least one of decreasing quantization error of said transponder and minimizing waste of said tape material.

2. The process of claim 1, wherein the step of forming the metallized pattern further comprises the steps of:
   forming a base layer of a first metal on the tape in the shape of the metallized pattern; and
   plating at least one passivation layer of a second metal onto the base layer.

3. The process of claim 2, wherein the step of forming the base layer further comprises the step of forming an antenna circuit pattern having a desired geometry.

4. The process of claim 2, wherein the step of forming the base layer comprises the steps of:
   providing a layer of the first metal onto the tape; and
   etching the layer to form the shape of the metallized pattern.

5. The process of claim 2, wherein the step of plating at least one passivation layer further comprises plating using an electrolytic process.

6. The process of claim 4, wherein the step of providing a layer further comprising depositing said layer.

7. The process of claim 4, wherein the step of providing a layer further comprising laminating said layer.

8. A process for manufacturing a radio frequency transponder, comprising the step of forming a metallized pattern on a tape of insulating, flexible substrate material having a usable width, the metallized pattern comprising at least one area of characteristic geometry having a length and a width, wherein the length is greater than the width and is oriented longitudinally along the tape, and wherein the step of forming the metallized pattern further comprises the steps of:
   a. forming a base layer of a first metal on the tape in the shape of metallized pattern further comprising the steps of:
      i. forming an antenna circuit pattern having a desired geometry;
      ii. forming a bussing structure including a metallized area formed along an edge of the tape and at least one bussing line intersecting the antenna circuit pattern; and
      iii. providing electrical contact, via the bussing structure, between the antenna circuit pattern and an electrode of an electroplating apparatus for plating the at least one passivation layer; and
   b. plating at least one passivation layer of a second material onto the base layer.

9. The process of claim 3, further comprising the steps of:
   attaching a radio frequency circuit to the tape;
   bonding the radio frequency circuit to the antenna circuit; and singulating an area of the substrate material containing the antenna circuit and radio frequency circuit from the tape to form the radio frequency transponder.

10. A process for manufacturing a radio frequency transponder, comprising the step of forming a metallized pattern on a tape of insulating, flexible substrate material having a usable width, the metallized pattern comprising at least one area of characteristic geometry having a length and a width, wherein the length is greater than the width and is oriented longitudinally along the tape, and wherein the step of forming the metallized pattern further comprises the steps of:

forming a base layer of a first metal on the tape in the shape of metallized pattern further comprising the step of forming an antenna circuit pattern having a desired geometry and wherein the length of the antenna circuit pattern is greater than the usable width of the tape; and plating at least one passivation layer of a second material onto the base layer.

11. The process of claim 2, wherein the first metal further comprises copper (Cu) and the second metal comprises at least one of nickel (Ni) and gold (Au).

12. The process of claim 2, wherein the step of plating at least one passivation layer further comprises plating using an electroless plating process.

13. The process of claim 1, wherein said metallized pattern further comprises plural ones of said area of characteristic geometry.

14. A process for manufacturing a radio frequency transponder, comprising the steps of:

forming a base layer of a first metal on a tape of insulating, flexible substrate material having a useable width to form a pattern comprising a plurality of antenna circuits each having a length and a width wherein the length is greater than the width and wherein the length is oriented longitudinally along the tape;

plating at least one passivation layer of a second metal onto the pattern;

attaching a radio frequency circuit to the tape and bonding the radio frequency circuit to the antenna circuit; and singulating an area of the substrate material containing the antenna circuit and radio frequency circuit from the tape to form the radio frequency transponder having a length which may be greater than the usable width of the tape.

15. The process of claim 14, wherein the step of forming the base layer comprises the steps of:

providing a layer of the first metal onto the tape; and etching the layer to form the shape of the metallized pattern.

16. The process of claim 15, wherein the step of plating at least one passivation layer further comprises plating using an electrolytic process.

17. The process of claim 16, wherein the step of forming the base layer further comprises the steps of:

forming an antenna circuit pattern having the characteristic geometry of the antenna circuits;

forming a bussing structure including a metallized area formed along an edge of the tape and at least one bussing line intersecting the antenna circuit pattern; and providing electrical contact, via the bussing structure, between the antenna circuit pattern and an electrode of an electroplating apparatus for plating the passivation layer.

18. The process of claim 17, wherein a length of the antenna circuit is greater than the usable width of the tape.

19. The process of claim 14, wherein the first metal comprises copper (Cu) and the second metal comprises at least one of nickel (Ni) and gold (Au).

20. The process of claim 14, wherein the step of plating a passivation layer further comprises plating using an electroless plating process.

21. A process for manufacturing radio frequency transponders having thin flexible substrates, comprising:

depositing a base layer onto a tape of insulating, flexible substrate material wherein the base layer is etched to form a generally continuous metallized pattern including a plurality of antenna circuits joined end-to-end along the tape;

plating an intermediate passivation layer onto the etched base layer;

plating an outer passivation layer onto the intermediate passivation layer;

attaching radio frequency circuits to the tape and bonding the radio frequency circuits to the antenna circuits; and singulating areas of the substrate material containing an antenna circuit and a radio frequency circuit from the tape to form radio frequency transponders wherein the length of the area singulated is selected to tune the antenna circuit by adjusting its length.

22. The process of claim 21, wherein the step of plating an intermediate passivation layer further comprises plating using an electrolytic process.

23. The process of claim 22, wherein the step of depositing the base layer further comprises the steps of:

forming an antenna circuit pattern having the characteristic geometry of the antenna circuits;

forming a bussing structure including a metallized area formed along an edge of the tape and at least one bussing line intersecting the antenna circuit pattern; and providing electrical contact, via the bussing structure, between the antenna circuit pattern and an electrode of an electroplating apparatus for plating the passivation layer.

24. The process of claim 21, wherein said base layer is comprised of copper Cu), said intermediate passivation layer is comprised of nickel (Ni), and said outer passivation layer is comprised of gold (Au).

25. The process of claim 21, wherein the step of plating an intermediate passivation layer further comprises plating using an electroless plating process.

* * * * *